United States Patent [19]
Santiago et al.

[11] Patent Number: 5,766,876
[45] Date of Patent: Jun. 16, 1998

[54] COMPOST BIN

[76] Inventors: Raphael Santiago, 178 Ave. D #2E, New York, N.Y. 10009; Paula Hewitt, 346 E. 9th St. #18, New York, N.Y. 10003; Rosa Ramirez, 640 Grand St. #2B, Brooklyn, N.Y. 11211; Alnardo Rodriguez, 725 FDR Dr. #2H, New York, N.Y. 10009; Thomas Outerbridge, 430 E. 9th St. #17, New York, N.Y. 10009; Melissa Ramos, 1223 FDR Dr. #2D, New York, N.Y. 10009; Tim Rutgers, 544 E. 13th St. #6C, New York, N.Y. 10009; Maddalena Polletta, 620 E. 11th St., New York, N.Y. 10009; Jason Montalvo, 1225 FDR Dr. #6B, New York, N.Y. 10009

[21] Appl. No.: 831,058

[22] Filed: Apr. 1, 1997

[51] Int. Cl.⁶ .................................... C12P 1/00
[52] U.S. Cl. .................. 435/41; 435/290.1; 71/9
[58] Field of Search .................. 435/41, 290.1, 435/290.4; 71/8–10; 220/4.28–4.34, 6, 484, 908

[56] References Cited

U.S. PATENT DOCUMENTS

| | | | |
|---|---|---|---|
| 3,951,294 | 4/1976 | Wilson | 220/5 |
| 4,060,945 | 12/1977 | Wilson | 52/169.5 |
| 4,211,033 | 7/1980 | Ringer | 47/45 |
| 5,156,290 | 10/1992 | Rodrigues | 220/87.1 |
| 5,322,793 | 6/1994 | Yarnell | 435/290.1 |
| 5,457,031 | 10/1995 | Masse | 435/41 |
| 5,695,986 | 12/1997 | Wold et al. | 435/290.1 |

*Primary Examiner*—David A. Redding
*Attorney, Agent, or Firm*—Goldstein & Associates

[57] ABSTRACT

A compost bin for decomposing compostable matter such as food and human waste, comprising a plurality of vertical bin walls which surround a base and define a bin interior which contains the compostable matter. In a preferred embodiment, four vertical bin walls are contemplated, forming a rectangle. A plurality of apertures are formed into the vertical bin walls, and a plurality of hollow ventilation tubes having perforations disposed about the periphery extend through the apertures. A cross-tube connects the hollow ventilation tubes and has a down-turned segment which extends perpendicular to the ground and terminates at an open cross-tube end. A bio-filter bag comprising a porous material and filled with organic material is secured to the open cross-tube end of the cross tube, such that any gases which manage to escape the bin interior through the perforations into the hollow ventilation tubes and down-turned segment of the cross-tube will be effectively filtered.

6 Claims, 2 Drawing Sheets

COMPOST BIN

BACKGROUND OF THE INVENTION

The invention relates to a compost bin. More particularly, the invention relates to an improved compost bin which more efficiently and effectively transforms what is typically regarded as "waste" into useable "compost".

Compost bins are commonly employed, both residentially and industrially, to convert matter such as food, garden and animal waste into useful, fertile compost. Typically, such matter is placed into the compost bin and allowed to decompose into finished compost which may then be used for a variety of purposes (most often as a fertilizer for gardening applications).

The decomposition process which serves as the basis for the compost bin's operation is exothermic in nature, and often causes heat to be unevenly distributed amongst the contents contained within the interior of the bin. Bins which are too small in size tend not to achieve the requisite thermal mass needed for efficient decomposition, and bins which are too large in size tend to be inefficient in that the weight of the compostable material contained within the bin interior causes the lower levels of material to compress, thus preventing adequate airflow thereto. An appropriately sized bin has yet to be developed and employed.

Adequate ventilation is essential to the decomposition process, and is typically provided by a plurality of openings upon the compost bin wall which allow air to enter the interior of the bin and penetrate the contents thereof. Often, however, only that material within the bin which is located immediately adjacent to these ventilation holes receives proper ventilation. The remainder of the material, i.e. that material located more towards the center region of the bin and not in proximity to the ventilation holes, lacks adequate air supply. As a result, the contents of the bin must often be "churned" or "stirred" so that these excluded quantities of compostable material may receive the aeration they require. A compost bin has yet to be developed which effectively manages to introduce proper ventilation to all regions of the compostable matter within the bin interior, and thus requires no stirring or churning of such matter. U.S. Pat. No. 4,060,945 to Wilson, for example, discloses a device which contemplates the utilization of a "trench-like" tunnel installed below the base of the compost bin, said tunnel purportedly for delivering a steady supply of air to the quantity of compostable material located within the bin. It appears, however, from inspection that the "tunnel" disclosed thereat is not truly in communication with the central interior regions of the bin, and hence would fail to adequately deliver a supply of air to compostable matter located thereat.

Typical compost bins are filled in layers—a first layer of composting material is placed upon the floor of the interior of the bin, and additional layers of material are subsequently placed thereupon. Eventually, the bottom layer (i.e. the initial volume of material placed in the bin) completes the decomposition process first, and thus needs to be removed as finished compost. Without sufficient access means to the lower region of the bin, the finished compost must be arduously removed from the top by penetrating the upper, unfinished levels of material which may all be at various stages of decomposition. In addition to proving a time consuming and messy task, this course of action might also interrupt a stable organic environment which is attempting to flourish within the bin.

Finally, many compost bins utilized today and disclosed in the prior art tend to emit foul odors during the decomposition process. As the waste material in the bin interior begins to decompose, complex nitrogen compounds which comprise these waste materials begin to break down in a process known as "ammonification". Unpleasant smelling ammonia and ammonium are released during this process, and tend to rise through the bin interior, escaping out of the bin top and into the surrounding environment. The prior art fails to disclose any composting device, system, process or method which effectively combats this problem.

SUMMARY OF THE INVENTION

It is an object of the invention to produce an improved compost bin which contains an optimal volume of compostable material, and thus attains the requisite thermal mass needed for efficient decomposition. The compost bin of the instant invention is sized such that uniform heat is distributed evenly throughout the interior of the bin, thus resulting in an efficient, stable decomposition process. Furthermore, the compost bin of the instant invention is sized such that the weight of the volume of compostable material placed therein will not cause the lower levels of material to compress, thus preventing adequate airflow thereto, nor will the weight of the upper levels of material cause the ventilation tubes employed thereat to bend or flex.

It is another object of the invention to provide a compost bin which manages to deliver a sufficient amount of air to all regions of the compostable material contained within the bin interior, and thus dispense with the need for such material to be churned or stirred. The compost bin of the instant invention contemplates the employment of a plurality of perforated ventilation tubes which extend through the walls of the bin and penetrate the interior region of the bin as well as all compostable material contained therein. Since these perforated ventilation tubes are hollow and extend through the bin walls to the exterior of the bin, the air located outside the bin is permitted to communicate with and is delivered to the interior region. Accordingly, a healthy, uniform and stable decomposing environment is permitted to flourish devoid of any cold, hot or stagnant areas.

The compost bin of the instant invention also comprises removable and interchangeable panels which comprise the bin walls. As a result, the panels comprising the front wall of the bin can be easily removed so that "finished" compost can be quickly and simply removed. Also, the interchangeable nature of said panels permits various configurations of ventilation tubes to be utilized to accommodate different "recipes" of mixtures of compostable materials.

It is a final object of the invention to produce a compost bin which employs odor control means to prevent the emission of malodorous gases typically resulting from the composting process within a compost bin. The compost bin which will be described in detail hereafter employs mechanical means, namely a cross-connecting tube which brings all of the upper ventilation tubes into communication, to prevent the escape of foul smelling gas. According to this embodiment, the ends of the ventilation tubes which are located exterior to the bin wall are not perforated and are connected to each other, merging into a single, down-turned tube (which is open at its end, so that adequate air may travel therethrough from the exterior of the bin towards the interior). This prevents foul odors which are emitted in the interior of the bin from escaping back into the perforation holes of the ventilation tubes, since the down-turned cross-connecting tube tends to trap gases thereat. In the event that gases do manage to escape, either through the down-turned cross-connecting tube or through the top of the bin, biological filtration means are also employed by the compost bin of the instant invention. As mentioned earlier, the foul smelling gases which result from ammonification tend to rise upward through the bin and escape from the top. The instant invention contemplates placing a layer of organic material on top of the actively composting waste to act as a "bio-filter". Nitrosomonas and nitrobacteria present in the bio-filter eventually nitrify the ammonification byproducts into a non-odorous nitrites, nitrates, carbon dioxide, oxygen and water.

A mesh bag filled with additional organic material is secured to the open end of the down-turned cross-connecting tube, and functions as a secondary "bio-filter" in the event that odorous gases manage to escape into the perforations of the ventilation tubes and out the down-turned cross-connecting tube. Accordingly, two safeguards are provided to prevent the escape of odorous gases from the compost bin. In addition, the bio-filtration process results in beneficial byproducts such as carbon dioxide, oxygen and water which contribute to healthy vegetation growth in the areas immediately surrounding the bin.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
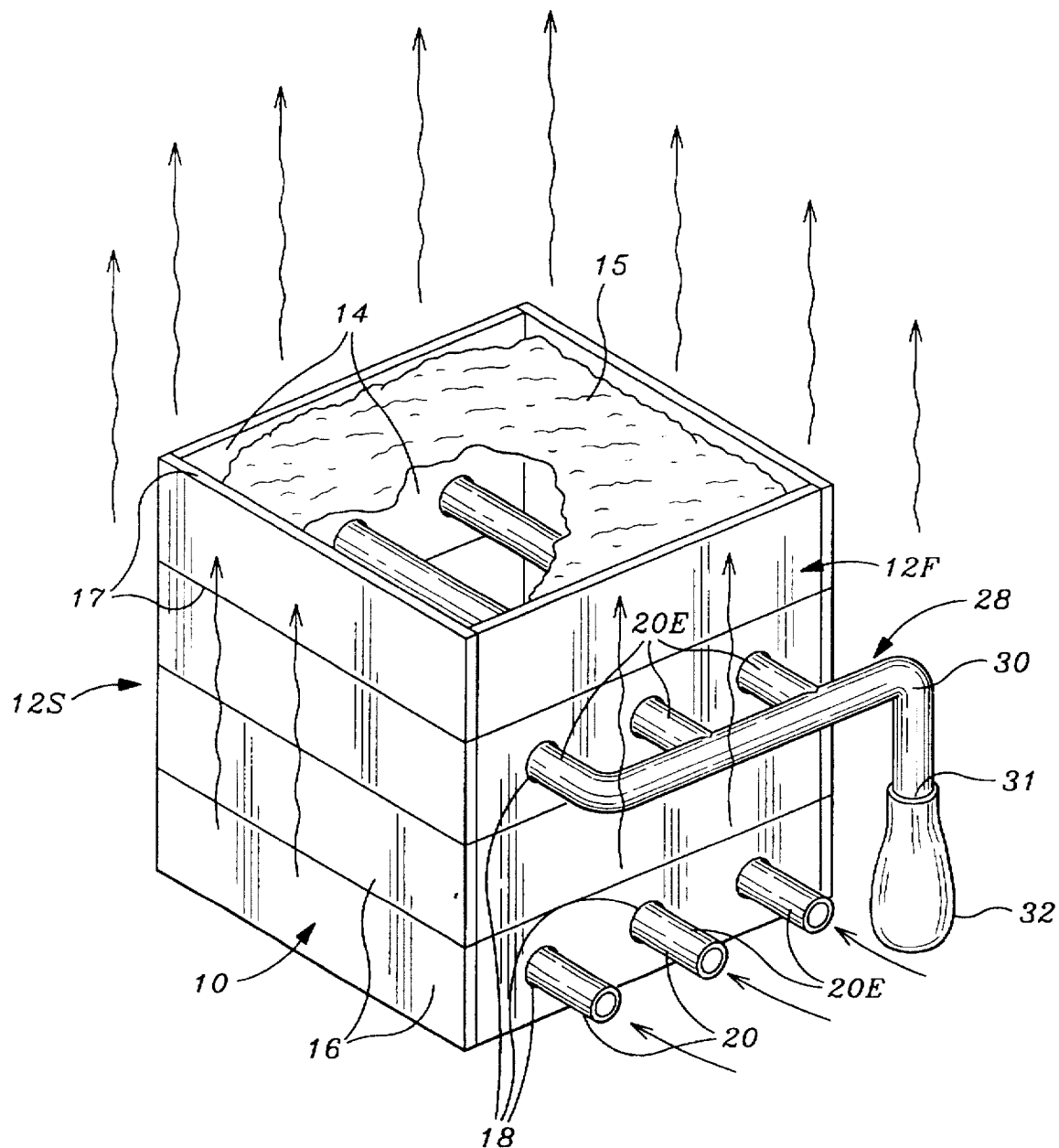
FIG. 1 is a diagrammatic perspective view of the compost bin of the instant invention, shown with parts broken away to expose a plurality of ventilation tubes which extend through an interior thereof.
Figure 2:
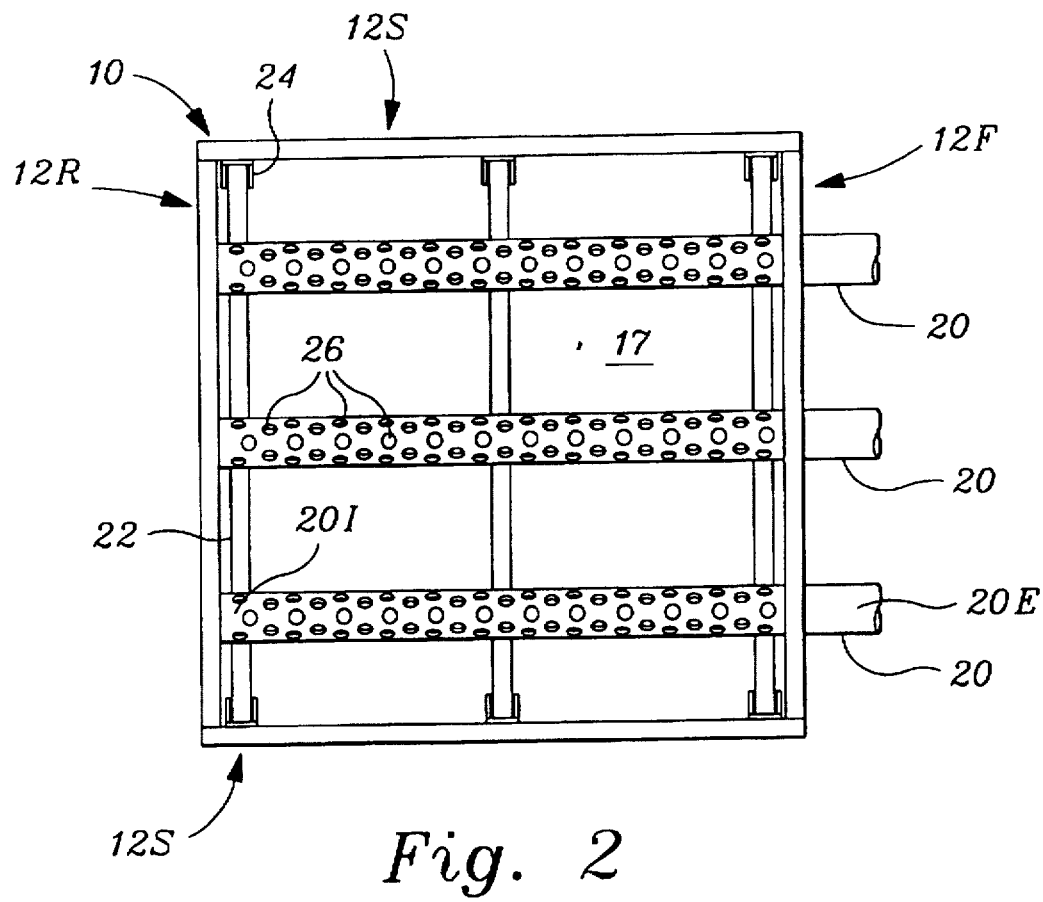
FIG. 2 is a top plan view of the compost bin of the instant invention, depicting the ventilation tubes extending through the interior of the bin, and support braces which are located thereunder.

FIG. 1 illustrates a compost bin 10. The compost bin 10 comprises a plurality of vertical bin walls 12 which define a bin interior 14 for containing compostable matter 15, and surround a base 17 as seen in FIG. 2. Each of said vertical bin walls 12 is comprised of a plurality of panels 16, each panel 16 having opposite straight parallel edges 17. The vertical bin walls 12 are formed by stacking the panels 16 one on top of the other such that the straight parallel edge 17 of one panel 16 abuts the straight parallel edge 17 of the panel 16 located adjacent to it, as seen clearly in FIG. 1.

In a preferred embodiment, the panels 16 which comprise the vertical bin walls 12 are approximately 2" thick and 10" high, the 2" thickness providing proper thermal insulation. Furthermore, the preferred embodiment of the compost bin 10 also contemplates that the configuration of the vertical bin walls 12 comprises a rectangle as shown, whose interior volume is optimally one cubic yard to achieve the proper thermal mass and produce uniform heat throughout the bin interior 14 during the composting process. It is also preferred that the length of the vertical bin walls 12 be equivalent, to further accommodate uniform heating throughout the bin interior 14. It should be recognized, however, that the panels 16 and vertical bin walls 12 can be of any size or shape.

As illustrated in FIG. 1 and further in FIG. 2, the preferred embodiment of the compost bin 10 contemplates four distinct vertical bin walls 12 formed by the panels 16— a front vertical bin wall 12F, a rear vertical bin wall 12R located opposite therefrom, and two opposite side vertical bin walls 12S. The panels 16 which comprise the front vertical wall 12F are removable, thus allowing compost material 15 contained within the bin interior 14 to be easily removed therefrom. This removable feature of the panels 16 of the front vertical wall 12F also serves an additional purpose, which will be discussed in detail below.

Figure 3:
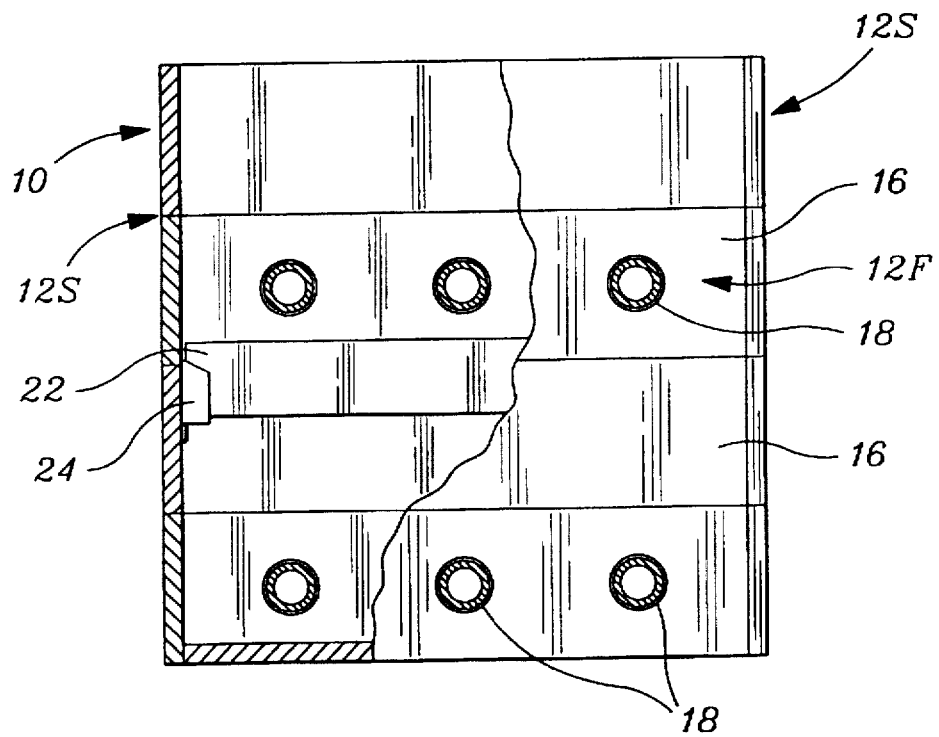
FIG. 3 is a side view of the compost bin, with parts broken away to show the position of the support braces below the ventilation tubes.

FIG. 1 and FIG. 3 depict that a plurality of apertures 18 are formed into various panels 16 which comprise the front vertical bin wall 12F. The apertures 18 of the preferred embodiment are aligned in distinct horizontal rows, adjacent to each other along the surface of the panels 16. Preferably, said apertures 18 are spaced apart such that the distance between apertures 18 in a particular horizontal row is 12", and the vertical distance between rows is 6", with the lowest row being 3" from the base 17 of the compost bin 10. Many other configurations are of course contemplated.

As seen also in FIG. 2, a number of hollow ventilation tubes 20 having an interior end 20I and an open exterior end 20E are shown, each tube 20 extending through one of said apertures 18 such that the interior end 20I of the tube 20 ends at the rear vertical bin wall 12R and does not pass therethrough. The hollow ventilation tubes 20 extend perpendicular to the front and rear vertical bin walls 12F and 12R.

As seen in FIG. 2, that portion of the hollow ventilation tubes 20 which is located within the bin interior 14 is perforated 26. In the preferred embodiment, said perforations 26 comprise a series of holes one-half inch in diameter (to prevent the compostable matter 15 within the bin interior 14 from clogging said holes), spaced 2 to 3 inches apart. The exterior ends 20E of the hollow ventilation tubes 20 are open, thus permitting air which surrounds the compost bin 10 to enter the bin interior 14 via the tubes 20 and perforations 26 located thereupon. Accordingly, the compostable material 15 located within the bin interior 14 which surrounds said hollow ventilation tubes 20 will receive the requisite aeration for efficient and optimal decomposition.

Said hollow ventilation tubes 20 are illustrated circular in shape, but may also be rectangular, triangular or any other suitable shape. In addition, the configuration of the hollow ventilation tubes 20 may be varied by removing and rearranging the detachable panels 16 which comprise the front vertical bin wall 12F. For instance, by rearranging the apertures 18 of the panels 16 by manipulating said panels 16 of the front vertical bin wall 12F, the distances between the hollow ventilation tubes 20 can be increased or decreased to accommodate various "recipes" of compostable material 15.

Braces 22 extend underneath each row of ventilation tubes 20 as seen in FIGS. 2 and 3, parallel to the front 12F and rear 12R vertical bin walls, between the side vertical bin walls 12S. Said braces 22 are secured to the side vertical bin walls 12S by means of joists 24 or similar securement means. The braces 22 serve to support the ventilation tubes 20 in the event that the volume of compostable matter 15 placed within the bin interior 14 becomes weighty and presses upon said tubes 20, causing them to sag.

As seen further in FIG. 1, a cross-tube 28 connects the exterior ends 20E of the hollow ventilation tubes 20. The cross-tube 28 extends parallel to the ground along the front vertical bin wall 12F and has a down-turned segment 30, which extends perpendicular to the ground, and an open cross-tube end 31. The down-turned segment 30 permits air from the exterior of the compost bin 10 to enter the open cross-tube end 31, travel through the cross-tube 28 to and through the hollow ventilation tubes 20 and then out of the perforations 26 to the bin interior 14 where it contacts the compostable matter 15 contained therein. The down-turned segment 30 prevents, however, malodorous gases emitted by the compostable matter 15 within the bin interior 14 from escaping into the perforations 26 and out of the hollow ventilation tubes 20. In the event that gases do manage to escape the bin interior 14 through the hollow ventilation tube 20 and down-turned segment 30 of the cross-tube 28, a bio-filter bag 32 which is secured to the open cross-tube end 31 filters and removes said gases.

To efficiently utilize the compost bin 10, a volume of absorbent material (such as hay or wood chip) is placed upon the base 17 to absorb extra moisture and waste seepage. The compostable matter 15 (preferably food waste, animal waste, lawn clippings, etc.) is then placed within the bin interior 14 on top of the absorbent material. A layer of finished compost or other organic matter is then placed on top of the loaded compostable matter 15 to act as an upper bio-filter. The bio-filter bag 32, preferably some type of porous, breathable material like mesh or cheesecloth, is filled with similar organic material and secured to the open cross-tube end 31 of the cross-tube 28.

Convection causes air from the exterior of the compost bin 10 to enter the bin interior 14 and hence assist in decomposition of the compostable matter 15 located therein. As the decomposition process progresses, the temperature of the bin interior 14 rises to approximately 120-145 degrees for 2 to 3 weeks (thus surpassing minimum EPA requirements for pathogen reduction). Typically, complex nitrogen compounds contained in the compostable matter 15 break down into foul smelling gases during a process of ammonification. The tendency of these gases is to rise upwards through the top of the compost bin 10, and escape therefrom into the surrounding environment. The upper bio-filter layer of organic material nitrifies these gases as they rise upward, converting them into non-odorous beneficial oxygen, carbon dioxide and water.

If the amount of gases due to ammonification of the decomposing matter 15 is so great that it escapes out of the open cross-tube end 31 of the cross-tube 28, the bio-filter bag 32 and organic material contained within will then convert these gases into non-odorous beneficial oxygen, carbon dioxide and water. Accordingly, the bio-filter bag 32 and down-turned segment 30 of the cross-tube 28 provide additional means to assure that foul smelling gases do not escape the compost bin 10.

Upon a particular volume of compostable matter 15 completing the decomposition process, the resultant "finished" compost can be withdrawn from the bin interior 14 by removing the panels 16 of the front vertical bin wall 12F.

What is claimed is:

1. An improved compost bin for effectively decomposing a volume of compostable matter such as food waste and the like, the compost bin having a plurality of vertical bin walls which surround a base and define a bin interior which contains said compostable matter, comprising:

a) a plurality of apertures formed into the vertical bin walls;

b) a plurality of hollow ventilation tubes each having an interior end and an open exterior end, extending through one of the plurality of apertures such that the open exterior end remains exterior to the compost bin, while the interior end and majority of the length of the hollow ventilation tube is contained within the bin interior in contact with the compostable matter contained therewithin, that portion of the hollow ventilation tube located within the bin interior having a plurality of perforations disposed about the periphery thereof, whereby the compostable matter contained within the bin interior receives proper aeration to permit efficient decomposition; and c) a cross-tube connecting the open exterior ends of the hollow ventilation tubes and having a down-turned segment which extends perpendicular to the ground and terminates at an open cross-tube end, the down-turned segment and open cross-tube end of the cross-tube permitting air to travel therethrough and reach the compostable matter within the bin interior, but preventing odorous gases from escaping from the bin interior through the perforations of the hollow ventilation tubes and out of the open exterior ends thereof as said gases will be unable to force through the down-turned segment of the cross-tube.

2. The compost bin of claim 1, wherein a bio-filter bag comprising a porous material and filled with organic material is secured to the open cross-tube end of the cross tube, whereby any gases which manage to escape the bin interior through the perforations into the hollow ventilation tubes and down-turned segment of the cross-tube will be effectively filtered.

3. The compost bin of claim 2, having four vertical bin walls forming a rectangle, namely a front vertical bin wall, a rear vertical bin located opposite therefrom and opposite side vertical bin walls, such that the bin interior formed by said vertical bin walls displaces a volume of one cubic yard.

4. The compost bin of claim 3, wherein the length of the vertical bin walls is equivalent to assure uniform heat distribution throughout the bin interior.

5. The compost bin of claim 4, wherein a plurality of panels comprise the front vertical bin wall, said panels removable to facilitate the withdrawal of finished compost from the bin interior, and to allow the apertures formed on said panels to be re-arranged so as to permit various configurations of hollow ventilation tubes to be realized to accommodate different recipes of compostable material.

6. A method of composting utilizing the compost bin of claim 2, comprising the steps of:

a) placing a volume of absorbent material upon the base of the compost bin to absorb moisture and seepage;

b) placing a volume of compostable matter such as food and animal waste within the bin interior upon the volume of absorbent material;

c) placing a layer of organic material such as finished compost on top of said volume of compostable material to act as a bio-filter to process any odorous gases which may attempt to seep therethrough; and d) placing a volume of said same organic material into the bio-filter bag which is secured to the open cross-tube end of the cross tube, so that any odorous gases which manage to escape the bin interior through the perforations into the hollow ventilation tubes and down-turned segment of the cross-tube will be effectively filtered.

* * * * *